(12) United States Patent
Du et al.

(10) Patent No.: US 11,345,622 B2
(45) Date of Patent: May 31, 2022

(54) ONLINE RESOURCEFUL TREATMENT METHOD OF ELECTROLESS COPPER PLATING WASTE SOLUTION

(71) Applicants: SOUTH CHINA INSTITUTE OF ENVIRONMENTAL SCIENCE, MEE, Guangdong (CN); CHONGQING MUNICIPAL SOLID WASTE MANAEMENT CENTER, Chongqing (CN); ZhiXI TECHNOLOGY (CHONGQING) CO., LTD., Chongqing (CN)

(72) Inventors: JianWei Du, Guangdong (CN); Kuang He, Guangdong (CN); Na Tang, Chongqing (CN); Wei Guan, Guangdong (CN); Yan Jia, Guangdong (CN); XiaoYing Hu, Guangdong (CN); MingYang Zhang, Guangdong (CN); MingShan Li, Guangdong (CN); Ning Huang, Chongqing (CN); Feng Xu, Chongqing (CN)

(73) Assignees: SOUTH CHINA INSTITUTE OF ENVIROMENTAL SCIENCES, MEE, Guangdong (CN); CHONGQING MUNCIPAL SOLID WASTE MANAGEMENT CENTER, Chongqing (CN); ZHIXI TECHNOLOGY (CHONGQING) CO., LTD., Chongqing (CN)

( * ) Notice: Subject to any disclaimer, the term of this patent is extended or adjusted under 35 U.S.C. 154(b) by 8 days.

(21) Appl. No.: 16/943,924

(22) Filed: Jul. 30, 2020

(65) Prior Publication Data

US 2021/0323847 A1    Oct. 21, 2021

(30) Foreign Application Priority Data

Apr. 17, 2020 (CN) .......................... 202010304792.7

(51) Int. Cl.
*C02F 1/46* (2006.01)
*B01J 23/72* (2006.01)
(Continued)

(52) U.S. Cl.
CPC ............. *C02F 1/4678* (2013.01); *B01J 23/72* (2013.01); *B01J 35/006* (2013.01); *B01J 37/04* (2013.01);
(Continued)

(58) Field of Classification Search
CPC ........ C02F 1/4678; C02F 1/447; C02F 1/001; C02F 1/46109; C02F 1/4672;
(Continued)

(56) References Cited

U.S. PATENT DOCUMENTS 3,899,405 A * 8/1975 Iverson ................. C02F 1/4678
588/303
4,420,401 A * 12/1983 Kretas ....................... C02F 1/62
204/DIG. 13

(Continued)

OTHER PUBLICATIONS

Setyo Sarwanto Moersidik, Optimization and reaction kinetics on the removal of Nickel and COD from wastewater from electroplating industry using Electrocoagulation and Advanced Oxidation Process, Science Direct, vol. 6, Issue 2, Feb. 2020, pages (Year: 2020).*

*Primary Examiner* — Joseph W Drodge
(74) *Attorney, Agent, or Firm* — Juan Carlos A. Marquez; Marquez IP Law Office, PLLC

(57) ABSTRACT

The disclosure discloses an online resourceful treatment method of electroless copper plating waste solution. According to the disclosure, a copper catalyst is adopted to perform autocatalytic reaction on electroless copper plating waste solution in an autocatalytic reactor, copper simple substances are reduced from copper ions in the waste solution and recycled, the treated waste solution enters into a three- (Continued)

dimensional electrolyzer and a membrane filtration plant for further purification, the finally treated electroless copper plating waste solution meets water quality discharge standard, and the recovery rate of the copper simple substances can reach up to above 95%.

4 Claims, 1 Drawing Sheet

(51) Int. Cl.

| | | |
|---|---|---|
| B01J 35/00 | (2006.01) | |
| B01J 37/04 | (2006.01) | |
| B01J 37/08 | (2006.01) | |
| C02F 1/00 | (2006.01) | |
| C02F 1/44 | (2006.01) | |
| C23C 18/16 | (2006.01) | |
| C23C 18/38 | (2006.01) | |
| C02F 1/467 | (2006.01) | |
| C02F 1/461 | (2006.01) | |
| C02F 101/20 | (2006.01) | |
| C02F 103/16 | (2006.01) | |

(52) U.S. Cl.
CPC .............. B01J 37/08 (2013.01); C02F 1/001 (2013.01); C02F 1/447 (2013.01); C02F 1/4672 (2013.01); C02F 1/46109 (2013.01); C23C 18/1617 (2013.01); C02F 2001/46152 (2013.01); C02F 2101/20 (2013.01); C02F 2103/16 (2013.01); C02F 2201/4614 (2013.01); C02F 2209/02 (2013.01); C02F 2209/06 (2013.01); C02F 2209/08 (2013.01); C23C 18/38 (2013.01)

(58) Field of Classification Search
CPC .............. C02F 2103/16; C02F 2209/06; C02F 2209/08; C02F 2101/20; C02F 2209/02; C02F 2201/4614; C02F 2001/46152; C02F 1/004; C02F 1/44; C02F 1/46114; C02F 1/52; C02F 1/5209; C02F 1/5227; C02F 1/5254; C02F 1/5272; C02F 1/56; C02F 1/66; C02F 1/70; C02F 1/705; C02F 1/72; C02F 1/725; C02F 9/00; C02F 2101/16; C02F 2101/30; C02F 2201/46152; B01J 37/04; B01J 35/006; B01J 37/08; B01J 23/72; B01J 19/08; B01J 19/087; B01J 19/12; B01J 37/084; C23C 18/1617; C23C 18/1619; C23C 18/1633; C23C 18/38; C23C 18/40; C25D 21/06; C25D 21/12; C25D 21/16; C25D 21/18; C25D 21/20; C25B 15/08; C25B 15/085
See application file for complete search history.

(56) References Cited

U.S. PATENT DOCUMENTS

| | | | | |
|---|---|---|---|---|
| 4,956,097 | A * | 9/1990 | Courduvelis | C02F 1/70 204/DIG. 13 |
| 5,112,392 | A * | 5/1992 | Anderson | C23C 18/1617 106/1.22 |
| 5,328,616 | A * | 7/1994 | Martyak | B01D 61/025 210/259 |
| 5,332,508 | A * | 7/1994 | Foster | C02F 1/325 204/157.44 |
| 5,609,767 | A * | 3/1997 | Eisenmann | C23C 18/1617 106/1.22 |
| 6,274,045 | B1 * | 8/2001 | Kreisler | C02F 1/683 210/710 |
| 6,596,148 | B1 * | 7/2003 | Belongia | C25D 21/18 204/237 |
| 6,942,779 | B2 * | 9/2005 | Belongia | C25D 21/18 205/101 |
| 2002/0153254 | A1 * | 10/2002 | Belongia | C25D 21/18 205/101 |
| 2003/0062306 | A1 * | 4/2003 | Perriello | C02F 3/30 210/611 |
| 2005/0139553 | A1 * | 6/2005 | Clark | C02F 1/46104 210/748.01 |
| 2005/0241947 | A1 * | 11/2005 | Nopper | C25D 21/18 205/98 |
| 2006/0243604 | A1 * | 11/2006 | Nakagawa | C02F 1/4678 205/775 |
| 2009/0242407 | A1 * | 10/2009 | Shiga | C02F 1/48 204/557 |
| 2010/0126944 | A1 * | 5/2010 | Braida | C02F 1/705 210/749 |
| 2010/0147765 | A1 * | 6/2010 | Jones | B01D 61/027 210/638 |
| 2014/0083322 | A1 * | 3/2014 | Haki | C23C 18/54 106/1.22 |
| 2015/0217222 | A1 * | 8/2015 | Hedin | B01J 20/28026 428/219 |
| 2016/0039698 | A1 * | 2/2016 | Gunasekaran | C02F 9/00 205/742 |
| 2018/0118659 | A1 * | 5/2018 | Hiles | B01D 3/009 |
| 2020/0021462 | A1 * | 1/2020 | Bailey | H04L 5/08 |
| 2020/0039852 | A1 * | 2/2020 | Guo | C23C 18/1689 |

* cited by examiner

ONLINE RESOURCEFUL TREATMENT METHOD OF ELECTROLESS COPPER PLATING WASTE SOLUTION

TECHNICAL FIELD

The disclosure belongs to the technical field of chemical plating, and particularly relates to an online resourceful treatment method of electroless copper plating waste solution.

BACKGROUND

Since electroless copper plating waste solution has complicated components, contained pollution factors is many in variety and high in concentration, and can difficult to directly treat. Furthermore, there is a considerable amount of valuable metal copper in the electroless copper plating waste solution. Directly discarding the electroless copper plating waste solution can cause serious resource wasting, which is contrary to the sustainable development strategy vigorously advocated at present. Therefore, resourceful utilization is the only way to dispose the electroless copper plating waste solution. However, copper will be transformed from the electroless copper plating wastewater into copper sulfide precipitate to be recycled. Although the technology in this direction is relatively mature, the risk of hydrogen sulfide overflow is easy to occur in the production process, and the value of copper sulfide is low.

The Chinese invention patent CN201611242802.9 discloses a resourceful utilization method of electroless copper plating waste solution. However, copper-rich sediment obtained by this method has many impurities, it is necessary to further purify copper simple substances. Moreover, the electroless copper plating waste solution is only recycled, rather than purifying the wastewater at the same time, so the treated wastewater can not meet national discharge standards.

SUMMARY

The object of the disclosure is to solve the problems in the prior art that the electroless copper plating waste solution is low in copper recovery rate, low in copper ion removal rate and substandard in waste solution treatment index, and then to provide an online resourceful treatment method of electroless copper plating waste solution, which can effectively improve the copper recovery rate, copper ion removal rate and water quality purification rate of the waste solution.

The technical solution of the disclosure is as follows: an online resourceful treatment method of electroless copper plating waste solution, comprising the following steps:

(1) autocatalytic reaction: filtering electroless copper plating waste solution to remove solid impurities and then introducing the filtered waste solution into an autocatalytic reactor, regulating pH to 13-14, controlling the temperature to 60~70° C., adding a copper catalyst according to a certain amount, sufficiently mixing the electroless copper plating waste solution with the copper catalyst via stirring under the condition of electromagnetic oscillation and performing an autocatalytic reduction reaction to reduce copper ions in the electroless copper plating waste solution into copper simple substances, carrying out cycle filtration on the copper simple substances for recovery, returning recycled water back to an auto-reaction catalysis device until the concentration of the copper ions in the electroless copper plating waste solution is lower than a threshold, followed by stopping cycle to enter the next stage;

(2) three-dimensional electrolysis: mixing the waste solution subjected to autocatalytic reaction with acidic solution until pH is 6.0-6.5, and then introducing the adjusted waste solution into a three-dimensional electrolysis device having a particle electrode for advanced oxidation treatment of COD, ammonia nitrogen and organic matters in the waste solution; the acidic solution is acidic wastewater produced by enterprises, and wastes are used to control wastes to solve resources.

(3) chemical precipitation: adding NaOH solution into the waste solution subjected to advanced oxidation treatment in step (2) to adjust the pH to 7-7.5, introducing the adjusted waste solution into a chemical precipitation device, adding a precipitator in an amount of 4-10 mg/L to coagulate impurities in the waste solution, and filtering to obtain supernatant;

(4) purification treatment: carrying out membrane separation on the supernatant obtained in step (3) using the membrane filtration plant, discharging clear water after separation, returning concentrate containing remaining copper ions after separation back to the autocatalytic reactor to perform autocatalytic reduction reaction with the next batch of copper plating waste solution, and recycling copper simple substances.

Further, the copper catalyst comprises the following components in percentage by weight: 20-26% of nano copper, 0.1-0.5% of cerium oxide, 2.5-4.5 of carbon black and the balance of nano cuprous oxide. Nano copper and nano cuprous oxide are 200-300 nm in particle size, can reduce copper ions into copper simple substances as a reducing agent, and is a main component in a copper catalyst. The copper simple substance generated by reaction can also be added into the autocatalytic reaction as a catalyst, thereby improving catalysis efficiency. Cerium oxide, rare earth element oxide, can serve as a catalyst for autocatalytic reaction to effectively promote the autocatalytic reaction.

Carbon black is mainly used as a dispersing agent in the process of preparation. Meanwhile, since carbon black itself is also the reducing agent, it cannot generate adverse effects on the whole catalyst system.

More further, a method for preparing the copper catalyst comprises the following steps:

S1: weighing nano copper, nano cuprous oxide, cerium oxide and carbon black according to the above proportion to obtain mixed powder, mixing the mixed powder with N,N-dimethylformamide to obtain dispersion liquid having a concentration of 0.25-0.35 g/mL, then adding poval whose mass is 25% of total mass of mixed powder, mixing to obtain electrostatic spinning solution, carrying out electrostatic spinning on the electrostatic spinning solution, and drying for 24 h at 70° C. to obtain wet spinning;

S2: calcining the wet spinning for 1 h at 220° C. in air, then annealing and carbonizing at 700-800° C. in an inert atmosphere, wherein the sintering time is 300 min, thereby obtaining three-dimensional carbonized spinning; and S3: repeatedly cycling and sucking the three-dimensional carbonized spinning for 12-24 h in NO airstream until the copper catalyst is obtained when adsorption saturation is achieved. Since the prepared three-dimensional carbonized spinning has good hole adsorption performance and can store gases, it can perform saturation adsorption on the reducing agent NO, thereby further promoting the catalysis performance of the catalyst.

Further, the addition amount of the copper catalyst is 2-10 g/L. The addition amount of the copper catalyst being less than 2-10 g/L can result in insufficient contact between the catalyst and the electroless copper plating waste solution, thereby reducing the catalysis efficiency; the addition amount of the copper catalyst being more than 2-10 g/L can not only cause wasting but also add burden for the subsequent treatment. Moreover, a large amount of catalyst can hinder the contact between reaction products and reactants, thereby reducing the autocatalytic reaction rate.

Further, the frequency of electromagnetic oscillation is 100-150 KHz, and the intensity of an electromagnetic field is 6000-7000K/Am. High-frequency electromagnetic oscillation can increase the kinetic energy of water molecules inside the electroless copper plating waste solution and improve the contact rates with the copper catalyst and reaction products, thereby improving the autocatalytic reaction efficiency.

Further, the electrolysis current of the three-dimensional electrolysis device is controlled to 0.6-0.7 A, and the electrolysis time is controlled to 2 h~3 h.

Further, the particle electrode is a polyacetylene/activated carbon composite particle having a particle diameter of 2 mm, and the addition amount of the particle electrode is 12-15 g/L. Polyacetylene/activated carbon composite particles are prepared according to the non-homogeneous polymerization method disclosed in the prior art, referring to the article "PREPARATION OF POLYACETYLENE/ACTIVATED CARBON COMPOSITE MATERIAL AND RESEARCH ON ITS CONDUCTIVITY". Polyacetylene/activated carbon has a three-dimensional structure, and electrons have a broader flow dimension. Therefore, the conductivity is high, which can improve the efficiency of three-dimensional electrolytic water treatment.

Further, the threshold of the concentration of the copper ions in the electroless copper plating waste solution is 0.3 mg/L. The limit being more than 0.3 mg/L increases burden for subsequent treatment equipment, and the limit being less than 0.3 mg/L can allow wastewater to cycle for a long time in the auto-reaction catalytic converter so as to cause reduced value.

Further, the precipitator comprises 67% of component A and 33% of component B, based on weight percent. The component A is composed of magnesium chloride and polyacrylamide in a mass ratio of 2:1; the component B is composed of 1% oxalic acid solution and starch in a mass ratio of 5:1; when in use, the component A is added and stirred for 30 min, and then the component B is added and stirred for 10 min, and stand lasts for 20 min. The magnesium chloride and polyacrylamide in component A build bridging between the ammonia nitrogen and soluble macromolecules in the waste solution to form the complex precipitate; then the oxalic acid starch mixture in component B builds bridging on the basis of the complex to form floccules as soon as possible so as to be removed. At the same time, oxalic acid and metal ions such as copper in the waste solution form complex precipitate so as to quickly remove pollutants in the waste solution.

Further, the autocatalytic reactor comprises a reaction tank, a catalyst adding frame, a high-frequency electromagnetic oscillator and a copper separation box, the reaction tank is made of a ceramic insulation material, the reaction tank is equipped with a jack for actively inserting the catalyst adding frame, as well as an electroless copper plating waste solution inlet and an alkali liquid inlet. The catalyst adding frame is equipped with a reflux port. The reaction tank is also internally equipped with a temperature probe, a pH probe, a copper ion detection probe and a heating rod. The lower part of the reaction tank is equipped with an aeration pipe for aeration and agitation. The aeration pipe is connected with an external air pump, and the high-frequency electromagnetic oscillator is arranged on the outer side wall of the reaction tank. The high-frequency electromagnetic oscillator is electrically connected with the external power supply through an oscillating circuit to generate an oscillating electromagnetic field. The copper simple substance separation box is connected under the water outlet of the reaction tank. The water outlet is provided with a main valve. The copper simple substance separation box is internally provided with a screen for intercepting and filtering the copper simple substances. The water outlet at the bottom of the copper simple substance separation box is pumped to the catalyst adding frame from the reflux port via the water pump until the copper ion detection probe detects that the concentration of copper ions in the waste solution is lower than a threshold, a drain valve is opened, and the waste solution is pumped to the three-dimensional electrolysis device via a water pump 2.

More further, a reflux box is arranged on a pipeline connected to the reflux port, and an ultrasonic vibrating rod is arranged in the reflux box for ultrasonic activation of the reflux water gathered in the reflux box. The ultrasonically activated wastewater is easier to react with the copper catalyst, thereby improving the reduction efficiency of the copper ions.

The disclosure has the beneficial effects:

(1) The disclosure adopts the copper catalyst to perform autocatalytic reaction on electroless copper plating waste solution in the autocatalytic reactor to reduce the copper ions in the waste solution into copper simple substances to be recycled, which not only performs online resourceful treatment on the waste solution to improve the recovery rate of copper simple substances but also reduces the burden of subsequent treatment equipment.

(2) The copper catalyst of the disclosure is NO-loaded three dimensional carbonized spinning obtained by mixing nano copper, nano cuprous oxide, cerium oxide and carbon black with poval to form electrostatic spinning solution and then performing electrostatic spinning, carbonization and NO adsorption, which is capable of conducting saturation adsorption utilizing the reducing agent NO and further promoting the catalysis performance of the catalyst.

(3) The waste solution undergoing autocatalytic treatment is further purified by the three-dimensional electrolysis device and the membrane filtration device successively. The final treated electroless copper plating waste solution meets treated water quality discharge standard, and the recovery rate of copper simple substances can reach up to above 95%.

wherein, 1—reaction tank, 2—electroless copper plating waste solution inlet, 3—alkali liquid inlet, 4—catalyst feeding frame, 5—temperature probe, 6—pH probe, 7—copper ion detection probe, 8—heating rod, 9—high-frequency electromagnetic oscillator, 10—jack, 11—aeration pipe, 12—air pump, 13—water outlet, 14—main valve, 15—copper single substance separation box, 16—screen, 17—water pump I, 18—reflux box, 19—ultrasonic vibrating rod, 20—water pump II, 21—aerial drainage valve, and 22—reflux port

DESCRIPTION OF THE EMBODIMENTS

Unless specifically indicated, materials and reagents used in examples are all conventionally used in the prior or commercially available in the market.

Example 1

Figure 1:
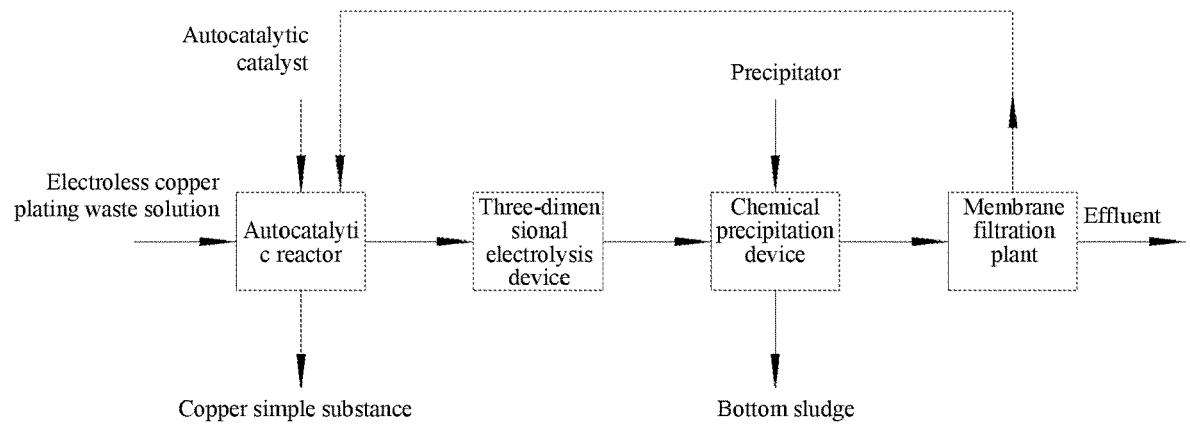
FIG. 1 is a flowchart of a method according to the disclosure.

As shown in FIG. 1, an online resourceful treatment method of electroless copper plating waste solution comprises the following steps:

(1) autocatalytic reaction: electroless copper plating waste solution was filtered to remove solid impurities, the filtered waste solution was introduced into an autocatalytic reactor, the pH was adjusted to 13.5, the temperature was controlled to 65° C., and a copper catalyst was added in an amount of 6 g/L. The copper catalyst contained mixed powder consisting of 23% of nano copper, 0.3% of cerium oxide, 3.5% of carbon black, 73.2% of nano cuprous oxide powder, based on weight percent. Under the condition of electromagnetic oscillation, the electroless copper plating waste solution was fully mixed with the copper catalyst and conducted autocatalytic reduction reaction to reduce solution into copper simple substances, the copper simple substance was subjected to cycle filtration for recovery, and recycled water was returned back to the autocatalytic reactor until the concentration of copper ions in the electroless copper plating waste solution was less than 0.3 mg/L threshold, and then entered the next stage.

Figure 2:
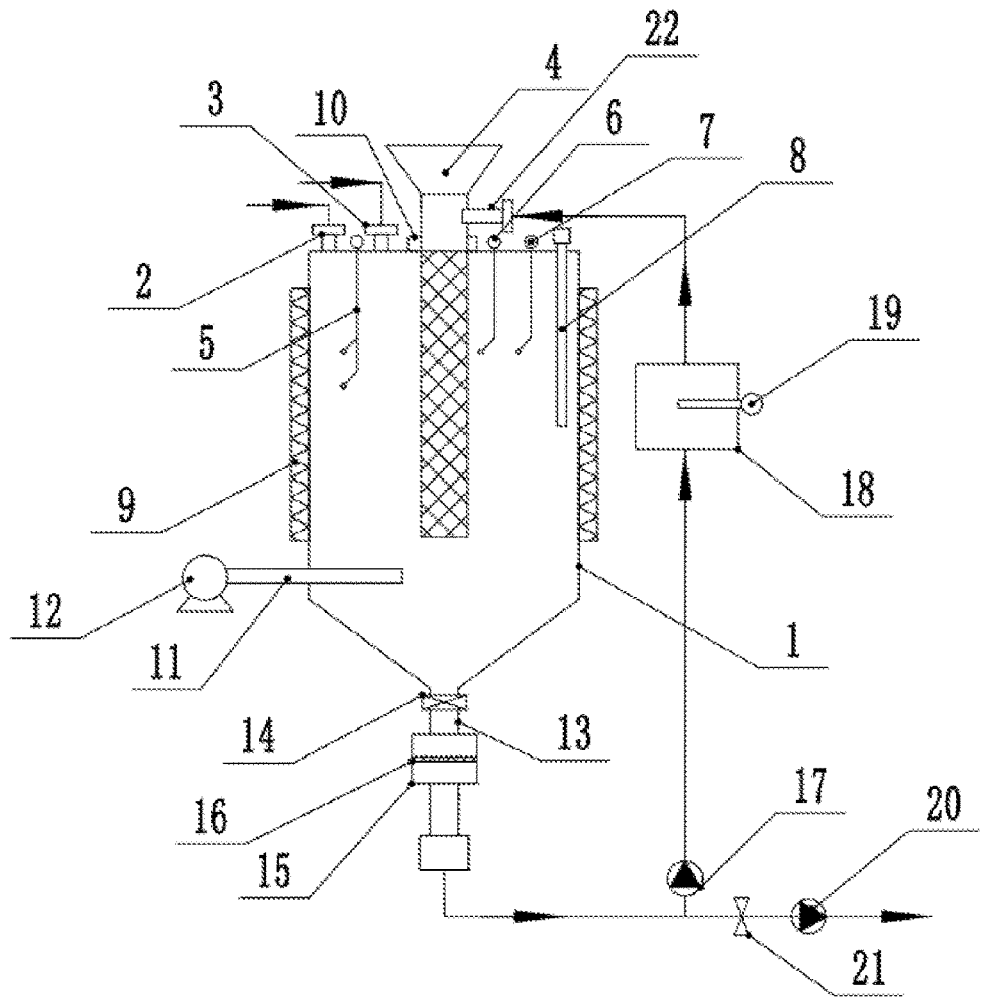
FIG. 2 is a structural diagram of an autocatalytic reactor according to the disclosure.

As shown in FIG. 2, the above autocatalytic reactor included a reaction tank 1, a catalyst adding frame 4, a high-frequency electromagnetic oscillator 9 and a copper simple substance separation box 15, wherein the reaction tank 1 was made of a ceramic insulation material, the reaction tank 1 was provided with a jack 10 for actively inserting the catalyst adding frame 4, the electroless copper plating waste solution inlet 2 and the alkali liquid inlet 3, the catalyst adding frame 4 was provided with a reflux port 22, and the reaction tank 1 was also internally provided with a temperature probe 5, a pH probe 6, a copper ion detection probe 7 and a heating rod 8. The lower part of reaction tank 1 was equipped with an aeration tube 11 for aeration and agitation. An aeration tube 11 was connected with an external air pump 12. A high-frequency electromagnetic oscillator 9 was arranged on the outer side wall of the reaction tank 1. The high-frequency electromagnetic oscillator 9 was used to generate an oscillating electromagnetic field. The copper simple substance separation box 15 was connected under the water outlet 13 of the reaction tank 1, and the water outlet 13 was provided with the main valve 14, and the screen 16 for intercepting and filtering the copper simple substance was arranged in the copper simple substance separation box 15. The effluent at the bottom of the copper simple substance separation box 15 was pumped to the catalyst adding frame 4 from the reflux port 22 through the water pump I 17 until the copper ion detection probe 7 detected that the concentration of the copper ions in the waste solution was less than the threshold, the aerial drain valve 21 was opened, and the waste solution was pumped to the three-dimensional electrolysis device through the water pump II 20. A reflux box 18 was arranged on a pipeline connected to the reflux port 22, and an ultrasonic vibrating rod 19 was arranged in the reflux box 18 for ultrasonic activation of the reflux water gathered in the reflux box 18. The ultrasonic activated wastewater was easier to react with the copper catalyst so as to improve the reduction efficiency of copper ions.

The working method and principle of the autocatalytic reactor are as follows: the filtered electroless copper plating waste solution is introduced into the reaction tank 1 from the electroless copper plating waste solution inlet 2, and NaOH solution is dropwise added to the waste solution through the alkali solution inlet 3, wherein pH is detected between 13 and 14 via the pH probe 6, then the heating rod 8 is opened to detect the temperature to 65° C. by the temperature probe 5, the copper catalyst is added into the catalyst adding frame 4 in an amount of 6 g/L, and the catalyst adding frame 4 extends into the reaction tank 1 from the jack 10. The electromagnetic frequency generated by the high-frequency electromagnetic oscillator 9 on the outer wall of the reaction tank 1 is 125 KHz, the oscillating electromagnetic field with electromagnetic intensity of 65000 k/Am can greatly improve the contact rate between wastewater and the catalyst, and then improve the efficiency of complex copper ion compounds that are difficult to reduce. During the reaction, aeration stirring is performed inside the waste solution via the aeration pipe 11 through the air pump 12. Because the reaction efficiency of the autocatalytic reaction system is slow in the early stage, the system needs to operate for 2 h. Then, the main valve 14 is opened to allow the waste solution to flow through the water outlet 13 into the copper simple substance separation box 15, the copper simple substance is intercepted by the screen 16, the waste solution is pumped from the reflux port 22 to the catalyst adding frame 4 through the water pump I 17, until the copper ion detection probe 7 detects that the concentration of copper ions in the waste solution is lower than the threshold, the aerial drain valve 21 is opened, and the waste solution is pumped to the three-dimensional electrolysis device through the water pump II 20. The catalytic efficiency can be improved by dynamic water circulation.

(2) Three dimensional electrolysis: the waste solution after the autocatalytic reaction in step (1) was mixed with acidic solution until the pH was 6.3, wherein the acidic solution was acidic wastewater generated by the enterprise. Waste controlled by waste is a better solution for resources. Then the mixed waste solution is introduced into a three-dimensional electrolysis device with a particle electrode. The electrolysis current was controlled to 0.65 A, and the electrolysis time was controlled to 2.5 h for advanced oxidation treatment of COD, ammonia nitrogen and organic substances in the waste solution; wherein the particle electrode was a polyacetylene/activated carbon composite particle with a particle size of 2 mm, and the addition amount of particle electrode was 13 g/L. Polyacetylene/activated carbon composite particles are prepared according to a non-homogeneous polymerization method disclosed in the prior art, specifically referring to the article "PREPARATION OF POLYACETYLENE/ACTIVATED CARBON COMPOSITE MATERIAL AND RESEARCH ON ITS CONDUCTIVITY".

(3) Chemical precipitation: NaOH solution was added to the waste solution after advanced oxidation treatment in step (2) so that pH was adjusted to 7.3, and the adjusted waste solution was introduced into the chemical precipitation device, the precipitator was added in an amount of 7 mg/L to coagulate the impurities in the waste solution, and supernatant was obtained by filtration; the precipitant comprised 67% of component A and 33% of component B based on weight percent, the component A was composed of magnesium chloride and polyacrylamide in a mass ratio of 2:1, the component B was composed of 1% oxalic acid solution and starch in a mass ratio of 5:1. The component A was firstly added and stirred for 30 minutes, and then the component B was added and stirred for 10 minutes, and stand lasted for 20 min. The magnesium chloride and polyacrylamide in the component A built bridging between the ammonia nitrogen and soluble macromolecules in the waste solution to form the complex precipitate; then the oxalate starch mixture in the component B built bridging on the basis of the complex, so that floccules form the precipitate as soon as possible so as to be removed. Meanwhile, oxalic acid can be used to form complex precipitate with copper and other metal ions in the waste solution, so as to quickly remove the pollutants in the waste solution.

(4) Purification treatment: the supernatant obtained in step (3) was subjected to membrane separation using the membrane filtration plant, and the separated clear water was discharged. The separated concentrate containing residual copper ions was returned back to the autocatalytic reactor to perform autocatalytic reduction reaction with the copper plating waste solution in the next batch, and copper simple substances were recycled.

The water quality of the purified wastewater was tested. The copper content in the effluent was measured as 0.07 mg/L, the effective removal rate of copper ions was 97.8%, the recovery rate of copper simple substances was 90%, the detection amount of ammonia nitrogen was 2 mg/L, the detection amount of COD was 26 mg/L, and the index of the treated electroless copper plating waste solution met the Table 2 standard of electroplating pollutant discharge standard (GB21900-2008).

Example 2

Example 2 is basically the same as example 1. The difference is that the preparation method of the copper catalyst comprises the following steps:

S1: weighing, by weight percent, 23% of nano copper, 0.3% of cerium oxide, 3.5% of carbon black and 73.2% of nano cuprous oxide to obtain the mixed powder, mixing the obtained mixed powder with N-dimethylformamide to form dispersion liquid having a concentration of 0.25-0.35 g/mL, and then mixing poval whose mass is 25% of a total mass of the mixed powder into electrostatic spinning solution, electrostatic spinning the electrostatic spinning solution, and drying at 70° C. for 24 hours to obtain wet spinning;

S2: calcining the wet spinning in air at 220° C. for 1 h, then annealing and carbonizing for 300 min at 700-800° C. in an inert atmosphere to obtain three-dimensional carbonized spinning, wherein sintering time is 300 min;

S3: placing the three-dimensional carbonized spinning in NO air stream to repeatedly recycle and suck for 12-24 hours to reach adsorption saturation, so as to obtain the copper catalyst. Because the prepared three-dimensional carbonized spinning has good hole adsorption property and can store gases, saturation adsorption is carried out on the reducing agent NO using three-dimensional carbonized spinning so as to further promote the catalytic performance of the catalyst.

The water quality of the purified wastewater was tested. The copper content in the effluent was measured as 0.05 mg/L, the effective removal rate of copper ions was 99.9%, the recovery rate of copper simple substances was 95%, the detection amount of ammonia nitrogen was 1 mg/L, the detection amount of COD was 15 mg/L, and the index of the treated electroless copper plating waste solution met the Table 2 standard of electroplating pollutant discharge standard (GB21900-2008).

By comparing example 1 with example 2, it is found that the removal rate of copper ions and the recovery rate of copper simple substances treated by using the three-dimensional carbonized spinning copper catalyst adsorbed with NO in example 2 are higher than those of the mixed powder copper catalyst in example 1.

Example 3

Study on influence of different components proportions and treatment manners of three-dimensional carbonized spinning-like copper catalyst in example 2 on removal rate of copper ions and recovery rate of copper simple substances, specifically as shown in in Table 1.

TABLE 1

Different components proportions and treatment manners of three-dimensional carbonized spinning-like copper catalyst

| | Nano copper | Cerium oxide | Carbon black | Nano cuprous oxide | Adsorb NO or not |
|---|---|---|---|---|---|
| Example 2 | 23% | 0.3% | 3.5% | 73.2% | Yes |
| Comparative example 1 | 20% | 0.1% | 2.5% | 77.4% | Yes |
| Comparative example 2 | 26% | 0.5% | 4.5% | 69% | Yes |
| Comparative example 3 | 23% | 0.3% | 3.5% | 73.2% | No |

The result of comparative example 1 is as follows: the detection amount of copper in the effluent is 0.05 mg/L, the effective removal rate of copper ions is 98.8%, and the recovery rate of copper simple substances is 93%.

The result of comparative example 2 is as follows: the detection amount of copper in the effluent is 0.06 mg/L, the effective removal rate of copper ions is 99.1%, and the recovery rate of copper simple substance is 93%.

The result of comparative example 3 is as follows: the detection amount of copper in the effluent is 0.07 mg/L, the effective removal rate of copper ions is 98.3%, and the recovery rate of copper simple substance is 91%.

Conclusion: the copper catalyst prepared by proportion and method in example 2 has the highest copper ion removal rate and copper simple substance recovery rate.

Example 4

The copper catalyst in example 2 was taken as experiment group 1, and four parallel groups, namely experiment groups 2-5, were set respectively. The on-line resourceful treatment of electroless copper waste solution was carried out using the method and device in example 1. The influence of addition amounts of different copper catalysts on autocatalytic reaction was studied, specifically as shown in Table 2.

TABLE 2

Influence of addition amounts of different copper catalysts on autocatalytic reaction

| | Addition amount of copper catalysts | Detection amount of copper in effluent | Effective removal rate of copper ions | Recovery rate of copper simple substances |
|---|---|---|---|---|
| Experimental group 1 | 6 g/L | 0.05 mg/L | 99.9% | 95% |

TABLE 2-continued

Influence of addition amounts of different copper catalysts on autocatalytic reaction

|  | Addition amount of copper catalysts | Detection amount of copper in effluent | Effective removal rate of copper ions | Recovery rate of copper simple substances |
|---|---|---|---|---|
| Experimental group 2 | 2 g/L | 0.17 mg/L | 97.5% | 90% |
| Experimental group 3 | 10 g/L | 0.14 mg/L | 98.2% | 93% |
| Experimental group 4 | 1 g/L | 0.55 mg/L | 84.3% | 83% |
| Experimental group 5 | 14 g/L | 0.31 mg/L | 87.6% | 85% |

Conclusion: when the addition amount of the copper catalyst is 6 g/L, and the effect of the autocatalytic reaction is optimal.

Example 5

1-5 experimental groups were set, the on-line resource treatment of electroless copper plating waste solution was carried out using the method and device of example 1 respectively, and the influence of effects of different electromagnetic oscillation conditions on the autocatalytic reaction was studied, specifically as shown in Table 3.

TABLE 3

Influence of different electromagnetic oscillation conditions on autocatalytic reaction

|  | Electromagnetic frequency | Electromagnetic intensity | Detection amount of copper in effluent | Effective removal rate of copper ions | Recovery rate of copper simple substances |
|---|---|---|---|---|---|
| Experimental group 1 | 125 KHz | 6500 K/Am | 0.07 mg/L | 97.8% | 90.0% |
| Experimental group 2 | 100 KHz | 6000 K/Am | 0.12 mg/L | 95.9% | 87.0% |
| Experimental group 3 | 150 KHz | 7000 K/Am | 0.15 mg/L | 96.2% | 88.2% |
| Experimental group 4 | 50 KHz | 5500 K/Am | 0.58 mg/L | 82.3% | 80.8% |
| Experimental group 5 | 200 KHz | 7500 K/Am | 0.45 mg/L | 83.4% | 81.9% |

Conclusion: it can be seen by comparison of experimental groups 1-5 that under the same treatment condition, the treatment effect of autocatalytic reaction having electromagnetic oscillation frequency of 125 KHz and electromagnetic intensity of 6500 K/Am is optimal Example 6

The influence of concentration thresholds of different copper ions in autocatalytic reaction in example 1 on wastewater purification effect, system operation efficiency and energy consumption was studied. Experimental groups 1-3 were set, in which the copper ion concentration threshold of experimental group 1 was 0.2 mg/L; the copper ion concentration threshold of experimental group 2 was 0.3 mg/L; the copper ion concentration threshold of experimental group 3 was 0.4 mg/L; the other conditions of experimental group 1-3 were the same, specifically as shown in Table 4.

Table 4 Influence of concentration thresholds of different copper ions on wastewater purification effect, system operation efficiency and energy consumption

TABLE 4

Influence of concentration thresholds of different copper ions on wastewater purification effect, system operation efficiency and energy consumption

|  | Experimental group 1 | Experimental group 2 | Experimental group 3 |
|---|---|---|---|
| Detection amount of copper in effluent | 0.07 mg/L | 0.07 mg/L | 0.22 mg/L |
| Effective removal rate of copper ions | 98.0% | 97.8% | 96.2% |
| Recovery rate of copper simple substances | 90% | 90% | 82% |
| Detection amount of ammonia nitrogen | 2 mg/L | 2 mg/L | 4 mg/L |
| Detection amount of COD | 25 mg/L | 26 mg/L | 35 mg/L |
| Operation efficiency | Low | High | mediate |
| Energy consumption | High | Low | mediate |

Conclusion: when the threshold of copper ion concentration in experimental group 1 is 0.2 mg/L, although the difference between the effluent index and the effluent index in experimental group 2 is not significant, too long cycle time of wastewater in the auto-reaction catalysis device causes low operating efficiency so as to result in high energy consumption; when the threshold of copper ion concentration in experimental group 3 is 0.4 mg/L, the burden of subsequent treatment equipment will be increased, so the effect of effluent index is reduced compared with those of experimental groups 1 and 2. In summary, when the concentration threshold of copper ions is 0.3 mg/L, the treatment effect is optimal under the same conditions.

Example 7

The influence of different particle electrodes on purification effect of wastewater was studied, wherein experimental group 1 was a polyacetylene/activated carbon composite particle, experimental group 2 was an activated carbon particle, experimental group 3 was nano iron, and the three experimental groups used the method and device of example 1 for water treatment, and the addition amount was 13 g/L, specifically as shown in Table 5.

TABLE 5

Influence of different particle electrodes on purification effect of wastewater

|  | Experimental group 1 | Experimental group 2 | Experimental group 3 |
|---|---|---|---|
| Detection amount of copper in effluent | 0.14 mg/L | 0.07 mg/L | 0.16 mg/L |
| Effective removal rate of copper ions | 97.0% | 97.8% | 96.6% |
| Recovery rate of copper simple substances | 88% | 90% | 87% |
| Detection amount of ammonia nitrogen | 5 mg/L | 2 mg/L | 7 mg/L |
| Detection amount of COD | 43 mg/L | 26 mg/L | 55 g/L |

Conclusion: it can be seen from Table 5 that the effluent effect of the three-dimensional electrolysis device using the polyacetylene/activated carbon composite particle as the particle electrode to treat wastewater is higher than those of activated carbon particles and nano iron.

Example 8

The influence of different precipitator components and addition manners on wastewater treatment results was studied, and the following experimental groups were as follows:

Experiment group 1: the precipitant comprised 67% of component A and 33% of component B based on weight percent, the component A was composed of magnesium chloride and polyacrylamide in a mass ratio of 2:1, The component B was composed of 1% oxalic acid solution and starch in a mass ratio of 5:1. When in use, the component A was added and stirred for 30 min, and then the component B was added and stirred for 10 min, standing lasted for 20 min.

Experimental group 2: the precipitant only comprised the component A, which was composed of magnesium chloride and polyacrylamide in a mass ratio of 2:1. The addition way was that the component A was directly added into the chemical precipitation device to be stirred with the wastewater for 30 min, and fully precipitated for 20 min.

Experiment group 3: the precipitant comprised, by weight percent, 67% of component A and 33% of component B. The component A was composed of magnesium chloride and polyacrylamide in a mass ratio of 2:1; the component B was composed of 1% oxalic acid solution and starch in a mass ratio of 5:1; when in use, the component A and the component B were simultaneously added to the chemical precipitation device to be stirred with the wastewater for 30 minutes, and fully precipitated for 20 min.

Experiment group 4: it was basically the same as experiment group 2, and the difference was that the precipitant comprised 80% of component A and 20% of component B based on weight percent, and the other conditions were the same as those in experiment group 2.

Experiment group 5: it was basically the same as experiment group 2, and the difference was that the precipitant comprised 50% of component A and 50% of component B based on weight percent, and the other conditions were the same as those in experiment group 2.

The experimental groups 1-5 used the method and device of example 1 to perform wastewater treatment, and treatment results are seen in Table 6.

TABLE 6

Influence of different precipitator components and addition manners on wastewater treatment result

|  | Experimental group 1 | Experimental group 2 | Experimental group 3 | Experimental group 4 | Experimental group 5 |
|---|---|---|---|---|---|
| Detection amount of copper in effluent | 0.19 mg/L | 0.07 mg/L | 0.10 mg/L | 0.13 mg/L | 0.15 mg/L |
| Effective removal rate of copper ions | 93.2% | 97.8% | 97.0% | 95.1% | 94.3% |
| Recovery rate of copper simple substances | 86.8% | 90% | 89.0% | 88.7% | 87.9% |
| Detection amount of ammonia nitrogen | 6 mg/L | 2 mg/L | 4 mg/L | 4 mg/L | 5 mg/L |
| Detection amount of COD | 46 mg/L | 26 mg/L | 33 mg/L | 34 mg/L | 38 mg/L |

Conclusion: the result of precipitator components and addition manners in experimental group 2 on wastewater treatment is better than those in other experimental groups.

From the comparison of examples 1-8, it can be seen that example 2, in which the copper catalyst is improved on the basis of example 1, has the best wastewater treatment effect. The optimal detection results are as follows: the detection amount of copper in effluent is 0.05 mg/L, the effective removal rate of copper ions is 99.9%, the recovery rate of copper simple substances is 95%, the detection amount of ammonia nitrogen is 1 mg/L, and the detection amount of COD is 15 mg/L.

What is claimed is:

1. An online resourceful treatment method of electroless copper plating waste solution, comprising the following steps:
   (1) autocatalytic reduction reaction: filtering the electroless copper plating waste fluid to remove solid impurities, then introducing the waste fluid into an autocatalytic reactor, adjusting pH to 13-14, controlling temperature to 60-70° C., adding a copper-based catalyst at a dosage of 2-10 g/L, wherein the copper-based catalyst comprises by percentage of weight: 20-26% of nano-copper, 0.1-0.5% of cerium oxide, 2.5-4.5% of carbon black, and the balance of nano cuprous oxide, after the copper-based catalyst is added, mixing the electroless copper plating waste fluid with the copper-based catalyst by stirring at a frequency of 100-150 KHz and an electromagnetic field intensity of 6,000-7,000 K/Am, and carrying out an autocatalytic reduction reaction to reduce copper ions in the electroless copper plating waste fluid into copper elementary substances for precipitation, filtering to recycle the copper elementary substances, returning the recycled electroless copper plating waste fluid to the autocatalytic reactor, and then stopping the autocatalytic reduction reaction until the concentration of copper ions in the electroless copper plating waste fluid is lower than a threshold;

(2) treatment of the electroless copper plating waste fluid by a three-dimensional electrolysis method: adjusting the pH of the electroless copper plating waste fluid obtained after the autocatalytic reaction of the step (1) to 6.0-6.5 with an acidic solution, and then introducing the electroless copper plating waste fluid after the pH adjustment into a three-dimensional electrolysis device containing a particle electrode for advanced oxidation treatment of COD, ammonia nitrogen and organic substances in the waste fluid in an electrolysis manner, wherein the particle electrode is a polyacetylene/activated carbon composite particle with a particle diameter of 2 mm, and the dosage of the particle electrode is 12-15 g/L, and the three-dimensional electrolysis device has an electrolysis current controlled at 0.6-0.7 A and an electrolysis time controlled between 2-3 h;

(3) chemical precipitation: adjusting the pH of the waste fluid after the advanced oxidation treatment of the step (2) with a NaOH solution to 7-7.5, introducing the waste fluid into a chemical precipitation device, adding a precipitant at a dosage of 4-10 mg/L to coagulate impurities in the waste fluid, and filtering to obtain a supernatant; and (4) purification treatment: subjecting the supernatant obtained in step (3) to membrane separation by a membrane filtration apparatus, discharging the separated clean water, and returning a separated concentrated solution containing residual copper ions to the autocatalytic reactor of step (1) for re-treatment.

2. The method according to claim 1, wherein a method for preparing the copper catalyst comprises the following steps:
  S1: weighing the nano-copper, the nano cuprous oxide, the cerium oxide and the carbon black according to the weight percentages in the copper-based catalyst to obtain mixed powder, mixing with N,N-dimethylformamide to form a dispersion with a concentration of 0.25-0.35 g/mL, then adding polyvinyl alcohol which accounts for 25% of a total mass of the mixed powder into the dispersion to form an electrostatic spinning solution, carrying out electrostatic spinning on the electrostatic spinning solution, and drying at 70° C. for 24 hours to obtain an electrostatic-spun yarn;
  S2: calcining the electrostatic-spun yarn in air at a condition of 220° C. for 1 h, and then annealing and carbonizing the electrostatic-spun yarn at a temperature of 700-800° C. under inert atmosphere for a duration of 300 min to obtain a three-dimensional carbonized spun yarn; and
  S3: placing the three-dimensional carbonized spun yarn in a NO airflow, and repeatedly and circularly sucking for 12-24 h to achieve adsorption saturation, so as to obtain the copper-based catalyst.

3. The method according to claim 1, wherein the threshold of the concentration of the copper ions in the electroless copper plating waste fluid is 0.3 mg/L.

4. The method according to claim 1, wherein the precipitant comprises 67% of component A and 33% of component B by percentage of weight;
  the component A comprises magnesium chloride and polyacrylamide, and the mass ratio of the magnesium chloride to the polyacrylamide 2:1;
  the component B comprises an oxalic acid solution with a concentration of 1 wt. % and starch, and the mass ratio of the oxalic acid solution with a concentration of 1 wt. % to the starch is 5:1; and
  when in use, the component A is added and stirred for 30 min, and then the component B is added and stirred for 10 min, and allowed to stand for 20 min to obtain the precipitant.

* * * * *